(12) United States Patent
Zhou et al.

(10) Patent No.: US 9,559,730 B2
(45) Date of Patent: Jan. 31, 2017

(54) MULTIPLEXER

(71) Applicant: ZTE CORPORATION, Shenzhen, Guangdong Provinc (CN)

(72) Inventors: Hong Zhou, Shenzhen (CN); Qi Tian, Shenzhen (CN); Nan Shen, Shenzhen (CN); Hua Yang, Shenzhen (CN); Lijuan Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 61 days.

(21) Appl. No.: 14/646,289

(22) PCT Filed: Aug. 21, 2013

(86) PCT No.: PCT/CN2013/081987
§ 371 (c)(1),
(2) Date: May 20, 2015

(87) PCT Pub. No.: WO2013/189404
PCT Pub. Date: Dec. 27, 2013

(65) Prior Publication Data
US 2015/0303951 A1 Oct. 22, 2015

(30) Foreign Application Priority Data
Nov. 21, 2012 (CN) .......................... 2012 1 0475369

(51) Int. Cl.
*H04B 7/155* (2006.01)
*H04B 1/00* (2006.01)
(Continued)

(52) U.S. Cl.
CPC .............. *H04B 1/0057* (2013.01); *H04B 1/52* (2013.01); *H04B 7/15557* (2013.01); *H04J 14/04* (2013.01); *H04J 14/08* (2013.01)

(58) Field of Classification Search
CPC .... H04L 5/0023; H04B 7/0669; H04J 3/1694; H04J 14/04; H04J 14/08
See application file for complete search history.

(56) References Cited

U.S. PATENT DOCUMENTS 7,239,650 B2 * 7/2007 Rakib ................. H03M 13/256
348/E7.07
8,149,742 B1 4/2012 Sorsby et al.
(Continued)

FOREIGN PATENT DOCUMENTS

CN 1917685 A 2/2007
CN 1922795 A 2/2007
(Continued)

OTHER PUBLICATIONS

Supplementary European Search Report issued Oct. 27, 2015 in European Patent Application No. EP13807022.2.

*Primary Examiner* — Raj Jain
(74) *Attorney, Agent, or Firm* — Plumsea Law Group, LLC.

(57) ABSTRACT

A multiplexer is disclosed configured between a transceiving antenna and a receiving channel and a transmitting channel; the transceiving antenna, the receiving channel and the transmitting channel are shared by signals of at least two modes. The multiplexer includes a combiner module, transmitting filter modules, receiving filter modules and amplifier modules in one-to-one correspondence with the signals of various modes. The multiplexer addresses the problem of how multi-mode signals share a transmitting channel, a receiving channel and a transceiving antenna.

12 Claims, 2 Drawing Sheets

(51) Int. Cl.
*H04J 14/04* (2006.01)
*H04B 1/52* (2015.01)
*H04J 14/08* (2006.01)

(56) References Cited

U.S. PATENT DOCUMENTS

| | | | | |
|---|---|---|---|---|
| 8,503,572 B2* | 8/2013 | Luo | ............... | H04B 7/0691 |
| | | | | 375/295 |
| 9,312,935 B2* | 4/2016 | Ketchum | ............. | H04B 7/0421 |
| 2005/0202842 A1 | 9/2005 | Brobston et al. | | |
| 2010/0302976 A1 | 12/2010 | Tikka | | |
| 2010/0322092 A1* | 12/2010 | Yu | ............... | H04L 25/03012 |
| | | | | 370/252 |
| 2011/0158211 A1* | 6/2011 | Gaal | ............... | H04L 25/0206 |
| | | | | 370/338 |
| 2015/0303951 A1* | 10/2015 | Zhou | ............... | H04B 1/52 |
| | | | | 370/280 |

FOREIGN PATENT DOCUMENTS

| CN | 101971511 A | 2/2011 |
|---|---|---|
| CN | 102056346 A | 5/2011 |
| CN | 102404021 A | 4/2012 |
| CN | 102457992 A | 5/2012 |

\* cited by examiner

MULTIPLEXER

CROSS-REFERENCE TO RELATED APPLICATION(S)

This application is the U.S. National Phase application of PCT application number PCT/CN2013/081987 having a PCT filing date of Aug. 21, 2013, which claims priority of Chinese patent application 201210475369.9 filed on Nov. 21, 2012, the disclosures of which are hereby incorporated by reference.

TECHNICAL FIELD

The present document relates to the field of communications, and particularly, to a multiplexer.

BACKGROUND OF THE RELATED ART

In the wireless communication system, FDD (Frequency Division Duplexing) mode and TDD (Time Division Duplexing) mode have become two mainstream communication modes at present. Since many operators have both FDD and TDD licenses, there are urgent needs to deploy the two systems, and high demands are made in terms of simplicity, unity, as well as volume and weight of the deployed radio frequency unit. Currently, there are two schemes for the deployment of a dual-mode system. One is to achieve a shared antenna feeder scheme via external devices. As shown in FIGS. 1, 01 and 04 are receiving filters in the FDD frequency band, 02 and 05 are transmitting filters in the FDD frequency band, and 03 and 06 are filters in the TDD frequency band, and this scheme connects the two systems of two separate FDD and TDD radio frequency units together through an external multiplexer, but this scheme has difficulty in the engineering installation, and the cost is high. The other is a channel independent mode. As shown in FIG. 2, the receiving filter 01' in the FDD frequency band, the transmitting filter 02' in the FDD frequency band and the filter 03' in the TDD frequency band are combined together, and this scheme only physically splices the TDD circuit and the FDD circuit together (for example, on one circuit board), without sharing the transmitting and receiving channels, and only places the two systems in the same housing, with the externally embodied form thereof being a radio frequency unit but the essence thereof being still two sets of independent systems.

SUMMARY

The embodiments of the present document provide a multiplexer to solve the problem of how multi-mode signals share a transmitting channel, a receiving channel and a transceiving antenna.

To solve the above technical problem, the embodiments of the present document employ the following technical scheme:

a multiplexer, set between a transceiving antenna and a receiving channel as well as a transmitting channel; wherein the transceiving antenna, the receiving channel and the transmitting channel are shared by signals of at least two modes, the multiplexer comprises:

a combiner module, as well as transmitting filter modules, receiving filter modules and amplifier modules in one-to-one correspondence with the signals of various modes;

wherein each transmitting filter module is configured to select a signal of a corresponding mode from signals to be transmitted through the transmitting channel, and transmit the signal of the corresponding mode to the transceiving antenna;

each receiving filter module is configured to select a signal of a corresponding mode from signals received by the transceiving antenna, and transmit the signal of the corresponding mode to the amplifier module connected thereto;

each amplifier module is configured to amplify the signal of the corresponding mode selected by the receiving filterer module connected thereto and transmit the signal of the corresponding mode to the combiner module;

the combiner module is configured to receive signals amplified by each amplifier module, performs combination processing on the signals, and transmit the combined signal to the receiving channel.

Alternatively, the signals of the at least two modes comprise signals of two modes that are frequency division duplexing signal and time division duplexing signal, respectively.

Alternatively, the multiplexer further comprises a time division duplexing device configured to connect or isolate a transmitting filter module and a receiving filter module corresponding to the time division duplexing signal.

Alternatively, the transmitting filter module and the receiving filter module corresponding to the time division duplexing signal are the same two filter modules, a first end of the time division duplexing device is connected to one of the two filter modules, a second end is connected to the other filter module of the two filter modules, and a third end is connected to the transmitting channel; or the third end is connected to the amplifier module corresponding to the time division duplexing signal.

Alternatively, the time division duplexing device comprises a first radio frequency switch, a second radio frequency switch and a two-way radio frequency switch; a first end of the two-way radio frequency switch is connected to one of the two filter modules; another end of the two-way radio frequency switch is connected to a first end of one of the first and second radio frequency switches, or is neither connected to the first radio frequency switch nor to the second radio frequency switch;

a second end of the first radio frequency switch is connected to the other filter module, and a second end of the second radio frequency module is connected to the transmitting channel;

or a first end of the first radio frequency switch is connected to the other filter module, and a second end of the second radio frequency switch is connected to the amplifier module corresponding to the time division duplexing signal.

Alternatively, the time division duplexing device comprises a first radio frequency switch, a second radio frequency switch and a circulator; one end of the circulator is connected to one of the two filter modules; the other end of the circulator is connected to a first end of one of the two radio frequency switches;

a second end of the first radio frequency switch is connected to the other filter module, and a second end of the second radio frequency switch is connected to the transmitting channel;

or the first radio frequency switch is connected to the other filter module, and the second radio frequency switch is connected to the amplifier module corresponding to the time division duplexing signal.

Alternatively, each receiving filter module or each transmitting filter module comprises at least one filter.

The multiplexer provided in the embodiments of the present invention makes the transceiving antenna, the receiving channel and the transmitting channel shared by signals of at least two modes, wherein taking the multiplexer provided within the radio frequency unit for example, it can achieve sharing the transceiving antenna, the receiving channel and the transmitting channel of the radio frequency unit in the FDD and TDD modes, such that the sharing of analog and digital parts in the radio frequency unit become a reality.

PREFERRED EMBODIMENTS OF THE INVENTION

The multiplexer provided in the embodiments of the present document can support signals of at least two modes, including but not limited to a FDD signal and TDD signal. The transceiving antenna, the receiving channel and the transmitting channel of the device where the multiplexer is located are shared by the signals of at least two modes, that is, the signals to be transmitted by the transmitting channel of the device where the multiplexer is located, as well as the signals received by the transceiving antenna and the receiving channel are signals of at least two modes; after the signals to be transmitted by the transmitting channel are selected by the respective transmitting filter modules corresponding to the signals of the various modes, a signal of the corresponding mode can be selected and then is transmitted through the transceiving antenna; after the signals received by the transceiving antenna are selected by the respective receiving filter modules corresponding to the signals of the various modes, a signal of the corresponding mode can be selected out and then is combined by the combiner module and transmitted to the receiving channel.

The filter modules used in the embodiments of the present document are selected in accordance with the modes supported by the multiplexer. Each receiving or transmitting filter module in the embodiments of the present document comprises at least one filter, the number of filters in each filter module can be selected according to specifications of the filters and space and arrangement requirements of circuit boards, and each filter comprises but is not limited to a surface acoustic wave (SAW) filter, a dielectric filter, a cavity filter, and so on. The combiner module comprises but is not limited to a combiner. The amplifier module comprises but is not limited to an amplifier, and the amplifier may be a low noise amplifier mainly used for amplifying the received signals, helping the subsequent circuits to demodulate the received signals. Materials of various filters, amplifier, time division duplexing device and combiner are selected according to the specifications, and the space and arrangement requirements of circuit boards.

The embodiments of the present document will be further expounded by the specific embodiments in conjunction with the accompanying drawings as below.

Figure 1:
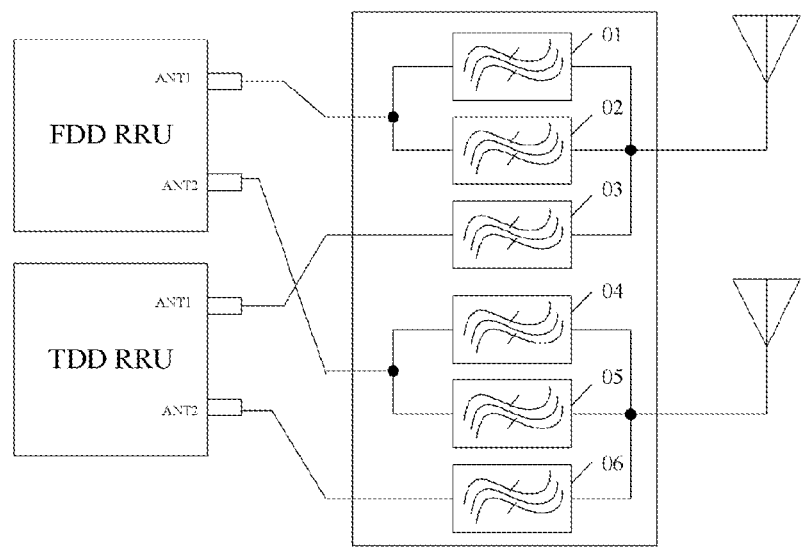
FIG. 1 is a schematic diagram of a multiplexer provided in the prior art.
Figure 2:
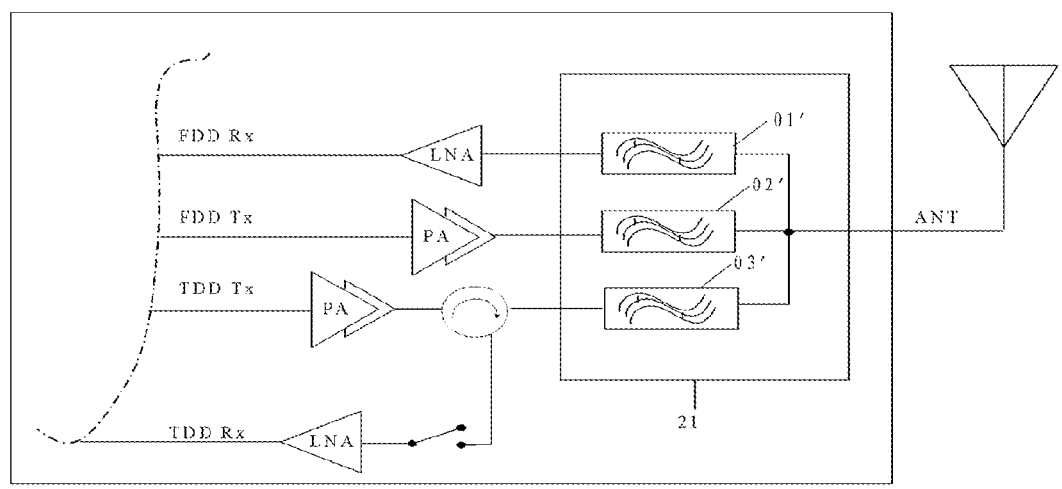
FIG. 2 is a schematic diagram of another multiplexer provided in the prior art.
Figure 3:
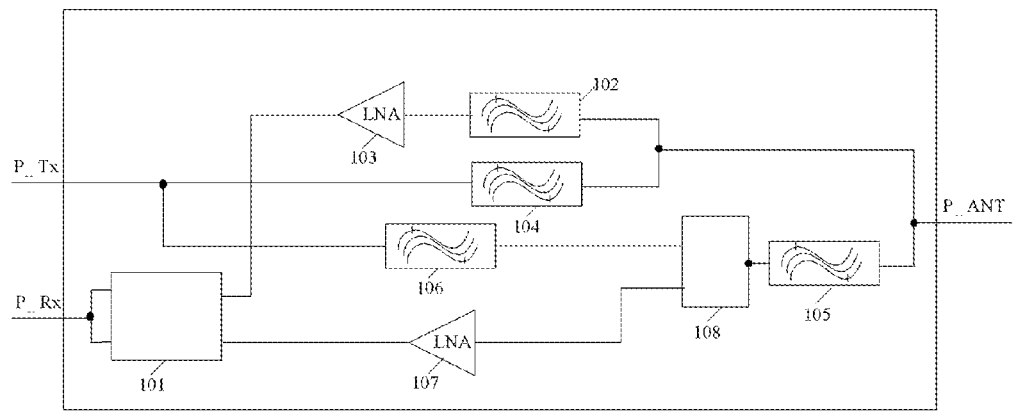
FIG. 3 is a schematic diagram of a multiplexer provided in one embodiment of the present document.

FIG. 3 is a schematic diagram of a multiplexer provided in one embodiment of the present document, and referring to FIG. 3: the multiplexer provided in the present embodiment is used for transmitting and receiving FDD and TDD signals, and comprises: a combiner 101, a first receiving filter 102 corresponding to the FDD signal, a first amplifier 103 connected between the first receiving filter 102 and the combiner 101, a first transmitting filter 104 corresponding to the FDD signal, a filter 105 corresponding to the TDD signal, a second transmitting filter 106 corresponding to the TDD signal, a time division duplexing device 108, a second amplifier 107 connected between the time division duplexing device 108 and the combiner 101; a first end of the time division duplexing device 108 is connected to the filter 105, a second end is connected to the second transmitting filter 106, and a third end is connected to the second amplifier 107, the time division duplexing device 108 is configured to connect one of the second and third ends to the first end, or disconnect the second and third ends from the first end. The filter 105 corresponding to the TDD signal and the second transmitting filter 106 may be the same filters, and since the filter 105 corresponding to the TDD signal is arranged between the time division duplexing device 108 and the transceiving antenna, it also plays a role in transmitting the TDD signal in the present embodiment.

The multiplexer has three external ports: P_Tx, P_Rx and P_ANT, wherein, the P_Tx is connected to a shared transmitting channel, and there are FDD-mode and TDD signals to be transmitted on the transmitting channel, and the signals are input to the multiplexer via this port; the P_ANT is connected to the transceiving antenna; the P_Rx is connected to the shared receiving channel and receive signals via the transceiving antenna, and after resisting blocking filtering and being low-noise amplified, respectively, the signals are input to the receiving channel via this port which is an uplink receiving output end of the multiplexer.

The multiplexer 10 provided in the present embodiment may be built in the radio frequency unit, or may be independent of the radio frequency unit. The multiplexer provided in the present embodiment can work alone in the TDD mode, or work alone in the FDD mode, or work in the TDD/FDD dual-mode mode. The specific working modes are as follows:

1) Working Alone in the TDD Mode

Downlink transmitting process: TDD downlink transmitting signals are to be transmitted on the shared transmitting channel, the time division duplexing device 108 connects the TDD downlink transmitting link (i.e., connects the link between the second transmitting filter 106 and the filter 105), and disconnects the TDD uplink receiving link (i.e., disconnects the link between the filter 105 and the second amplifier 107), the TDD downlink transmitting signals enter the multiplexer via the P_Tx port, and are transmitted to the P_ANT port via the second transmitting filter 106, the time division duplexing device 108 and the filter 105, and then are transmitted to the transceiving antenna.

Uplink receiving process: TDD uplink receiving signals are received by the transceiving antenna, the time division duplexing device 108 connects the TDD uplink receiving link (i.e., connects the link between the filter 105 and the second amplifier 107), and disconnects the TDD downlink transmitting link (i.e., disconnects the link between the second transmitting filter 106 and the filter 105), the TDD uplink receiving signals enter the multiplexer via the P_ANT port, and then are input into the P_Rx port via the filter 105, the time division duplexing device 108, the second amplifier 107 and the combiner 101, and enter the shared receiving channel.

2) Working Alone in the FDD Mode

Downlink transmitting process: FDD downlink transmitting signals are to be transmitted on the shared transmitting channel, the time division duplexing device 108 disconnects the TDD uplink receiving link and the TDD downlink transmitting link, the FDD downlink transmitting signals enter the multiplexer via the P_Tx port, and then are transmitted to the P_ANT port via the first transmitting filter 104 and are transmitted to the transceiving antenna.

Uplink receiving process: FDD uplink receiving signals are received by the transceiving antenna are, the time division duplexing device 108 disconnects the TDD uplink receiving link and the TDD downlink transmitting link, the FDD uplink receiving signals enter the multiplexer port via the P_ANT port, and then are input into the P_Rx port via the first receiving filter 102, the first amplifier 103 and the combiner 101 and enter the shared receiving channel.

3) Working in the TDD/FDD Dual-Mode Mode

Downlink transmitting process: TDD/FDD downlink transmitting dual-mode signals are to be transmitted on the shared transmitting channel, the time division duplexing device 108 connects the TDD downlink transmitting link (i.e., connects the link between the second transmitting filter 106 and the filter 105), and disconnects the TDD uplink receiving link (i.e., disconnects the link between the filter 105 and the second amplifier 107), the TDD/FDD downlink transmitting dual-mode signals enter the multiplexer via the P_Tx port, and enter the first transmitting filter 104 and the second transmitting filter 106, respectively, and the FDD signals are selected out after filtered by the first transmitting filter 104, and are transmitted to the P_ANT port and then transmitted to the transceiving antenna; the TDD signals are selected out after filtered by the second transmitting filter 106, and are transmitted to the P_ANT port via the time division duplexing device 108 and the filter 105 and then are transmitted to the transceiving antenna.

Uplink receiving process: TDD/FDD uplink receiving dual-mode signals are received by the transceiving antenna, the time division duplexing device 108 connects the TDD uplink receiving link (i.e., connects the link between the filter 105 and the second amplifier 107), and disconnects the TDD downlink transmitting link (i.e., disconnects the link between the second transmitting filter 106 and the filter 105), and the TDD/FDD uplink receiving dual-mode signals enter the multiplexer via the P_ANT port, and then enter the first receiving filter 102 and the filter 105, respectively, and the FDD signals are selected out after filtered by the first receiving filter 102, are transmitted to the first amplifier 103 to be amplified and then are transmitted to the combiner 101 to be combined, are input into the P_Rx port, and enter the shared receiving channel; the TDD signals are selected out after filtered by the filter 105, and are input into the P_Rx port via the time division duplexing device 108, the second amplifier 107 and the combiner 101, and enter the shared receiving channel.

Wherein, the combiner 101 is configured to combine the FDD uplink receiving signals and the TDD uplink receiving signals, and transmit them into the shared receiving channel.

The first receiving filter 102 is configured to select out the FDD signals in the uplink receiving direction, allow the FDD signals on the uplink receiving direction to pass through, totally reflect the TDD signals and the FDD signals in the downlink transmitting direction, and resist blocking filtering.

The first amplifier 103 is configured to amplify the FDD signals selected out in the uplink receiving direction.

The first transmitting filter 104 is configured to select out the FDD signals in the downlink transmitting direction, allow the FDD signals in the downlink transmitting direction to pass through, filter out the out-of-band stray to prevent the stray from passing through the P_ANT port to affect the FDD UL (Uplink) reception as well as the TDD UL reception; and totally reflect the TDD signals.

The second transmitting filter 106 is configured to select out the TDD signals in the downlink transmitting direction, allow the TDD signals in the downlink transmitting direction to pass through and meanwhile totally reflect the FDD signals.

The filter 105 is configured to select out the TDD signals, and suppress signals other than the TDD signals. In the uplink receiving direction, it selects out the TDD signals, allows the TDD signals to pass through and totally reflect the FDD signals; in the downlink transmitting direction, it further strengthens the role in filtering the stray out of the TDD transmission band, and shares the out-of-band suppression requirements of the second transmitting filter module 106.

The second amplifier 107 is configured to amplify the selected-out TDD signals in the uplink receiving direction.

The time division duplexing device 108 is configured to connect or isolate the filter 105 and the second transmitting filter 106 (as above, connect the link between the filter 105 and the second transmitting filter 106 at some moments, and disconnect the link between the filter 105 and the second transmitting filter 106 at some other moments), so as to meet the time division separation requirements of TDD; meanwhile, it is also used to guarantee interference isolation between the TDD link and the FDD link, and when the FDD downlink transmission and the TDD uplink reception proceed at the same time, the isolation role is enhanced to prevent: the FDD downlink transmitting signals from blocking the TDD uplink receiving signals, and the FDD downlink transmitting signals from spuriously interfering the TDD uplink reception in the TDD frequency band, and when TDD uplink reception proceeds, the isolation between the P_Tx port and the P_Rx port is strengthened.

In this embodiment, the receiving frequency band of the first receiving filter 102 may be 2500 MHz-2570 MHz, the transmitting frequency band of the first transmitting filter 104 may be 2620 MHz-2690 MHz, the receiving frequency band of the filter 105 or the transmitting frequency band of the second transmitting filter 106 may be 2575 MHz-2615 MHz, and all the filters can be dielectric filters.

In another embodiment, the filter 105 and the second transmission filter 106 switch their positions.

In another embodiment, the time division duplexing device 108 is configured between the filter 105, the second transmission filter 106 and the P_ANT port, that is, a first end of the time division duplexing device 108 is connected to the P_ANT port, a second end is connected to the filter 105, and a third end is connected to the second transmitting filter 106.

The specific structure of the time division duplex device 108 can be selected from a single-pole switch or a PIN switch according to requirements such as switching frequency, isolation between circuits, and power, and the number of switches can be selected according to the inter-circuit isolation requirements.

Figure 4:
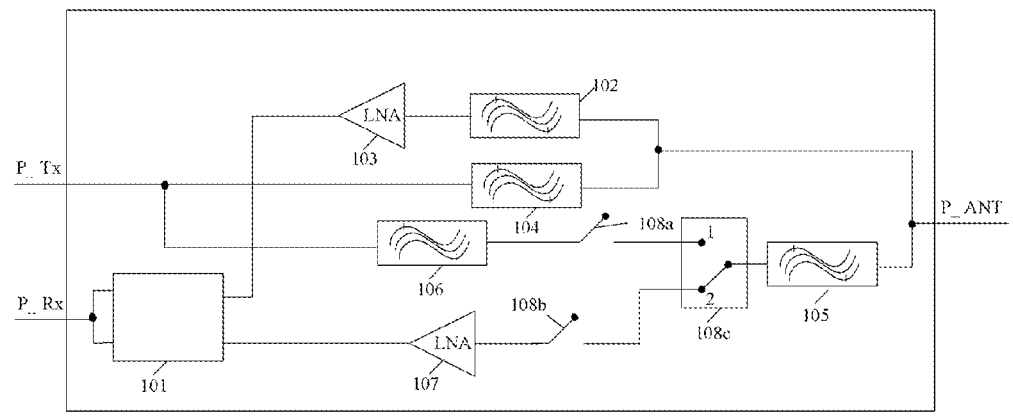
FIG. 4 is a schematic diagram of a multiplexer provided in another embodiment of the present document.

FIG. 4 is a schematic diagram of the multiplexer provided in another embodiment of the present document, and referring to FIG. 4: the difference between the multiplexer provided in the present embodiment and the multiplexer shown in FIG. 3 is that: the time division duplexing device 108 comprises two radio frequency switches 108a and 108b, and further comprises a two-way radio frequency switch 108c, and the radio frequency switches 108a and 108b are provided in the TDD downlink transmitting link and the TDD uplink receiving link, respectively, and the two-way radio frequency switch 108c is provided between the radio frequency switches 108a, 108b and the filter 15. The specific working modes are as follows:

1) Working Alone in the TDD Mode

Downlink transmitting process: TDD downlink transmitting signals are to be transmitted on the shared transmitting channel, the radio frequency switch 108a is closed while the radio frequency switch 108b is disconnected, the two-way radio frequency switch 108c connects the filter 105 to position 1, and the TDD downlink transmission signals are transmitted to the P_ANT port via the P_Tx port, the second transmitting filter 106, the radio frequency switch 108a, the position 1 of the two-way radio frequency switch 108c, and the filter 105, and then are transmitted to the transceiving antenna.

Uplink receiving process: TDD uplink receiving signals are received by the transceiving antenna, the radio frequency switch 108b is closed while the radio frequency switch 108a is disconnected, the two-way radio frequency switch 108c connects the filter 105 to position 2, and the TDD uplink receiving signals are input into the P_Rx port via the P_ANT port, the filter 105, the position 2 of the two-way radio frequency switch 108c, the radio frequency switch 108b, the second amplifier 107, and the combiner 101, and then enter the shared receiving channel.

2) Working Alone in the FDD Mode

Downlink transmitting process: FDD downlink transmitting signals are to be transmitted on the shared transmitting channel, the radio frequency switches 108a and 108b and the two-way radio frequency switch 108c are all disconnected, and the FDD downlink transmitting signals are transmitted to the P_ANT port via the P_Tx port and the first transmitting filter 104, and are transmitted to the transceiving antenna.

Uplink receiving process: FDD uplink receiving signals are received by the transceiving antenna, the radio frequency switches 108a and 108b and the two-way radio frequency switch 108c are all disconnected, and the FDD uplink receiving signals are input into the P_Rx port via the P_ANT port, the first receiving filter 102, the first amplifier 103 and the combiner 101, and enter the shared receiving channel.

3) Working in the TDD/FDD Dual-Mode Mode

Downlink transmitting process: TDD/FDD downlink transmitting dual-mode signals are to be transmitted on the shared transmitting channel, the radio frequency switch 108a is closed while the radio frequency switch 108b is disconnected, the two-way radio frequency switch 108c connects the filter 105 to position 1, the TDD/FDD downlink transmitting dual-mode signals respectively enter the first transmitting filter 104 and the second transmitting filter 106 via the P_Tx port, and the FDD signals are selected out after filtered by the first transmitting filter 104, are transmitted to the P_ANT port and are transmitted to the transceiving antenna; the TDD signals are selected out after filtered by the second transmitting filter 106, and then are transmitted to the P_ANT port via the radio frequency switch 108a, the position 1 of the two-way radio frequency switch 108c, and the filter 105, and are transmitted to the transceiving antenna.

Uplink receiving process: TDD/FDD uplink receiving dual-mode signals are received by the transceiving antenna, the radio frequency switch 108b is closed while the radio frequency switch 108a is disconnected, the two-way radio frequency switch 108c connects the filter 105 to the position 2, the TDD/FDD uplink receiving dual-mode signals respectively enter the first receiving filter 102 and the filter 105 via the P_ANT port, are transmitted to the first amplifier 103 to be amplified after filtered by the first receiving filter 102, and then are transmitted to the combiner 101 to be combined, are input into the P_Rx port, and enter the shared receiving channel; after filtered by the filter 105, they are input into the P_Rx port via the position 2 of the two-way radio frequency switch 108c, the radio frequency switch 108b, the second amplifier 107 and the combiner 10, and then enter the shared receiving channel.

In another embodiment, the filter 105 and the second transmission filter 106 switch their positions.

In another embodiment, the filter 105 is configured between the second amplifier 107 and the radio frequency switch 108b, and the specifications of the second transmitting filter 106 are adjusted accordingly.

Figure 5:
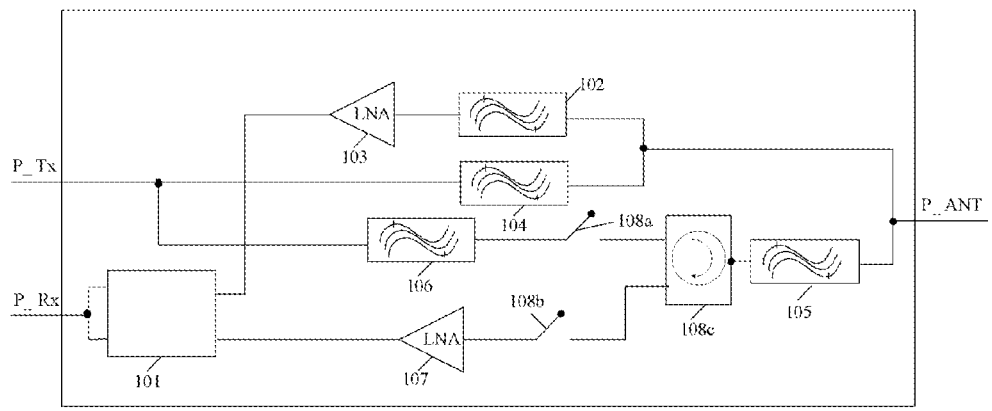
FIG. 5 is a schematic diagram of a multiplexer provided in another embodiment of the present document.

FIG. 5 is a schematic diagram of the multiplexer provided in another embodiment of the present document, and referring to FIG. 5: the difference between the multiplexer provided in the present embodiment and the multiplexer shown in FIG. 4 is that: the time division duplexing device 108 further comprises a circulator 108c' in addition to two radio frequency switches 108a and 108b, and the radio frequency switches 108a and 108b are provided in the TDD downlink transmitting link and the TDD uplink receiving link, respectively, and the circulator 108c' is provided between the radio frequency switches 108a, 108b and the filter 15. Its working processes are the same as the multiplexer shown in FIG. 4.

Those skilled in the art can understand that all or part of the steps of the above method may be completed by a program instructing the relevant hardware, and the program may be stored in a computer-readable storage medium, such as Read Only Memory, magnetic disk or optical disk. Alternatively, all or part of the steps of the above embodiments may also be implemented by using one or more integrated circuits. Accordingly, each module/unit in the above embodiments may be realized in the form of hardware, or in the form of software function modules. The present document is not limited to the combination of hardware and software in any specific form.

Although the preferred embodiments of the present document are disclosed for illustrative purposes, those skilled in the art will appreciate that various improvements, additions and substitutions are also possible, and therefore the scope of the present document should not be limited to the above-mentioned embodiments.

Industrial Applicability

The multiplexer provided in the embodiments of present document makes the transceiving antenna, the receiving channel and the transmitting channel shared by signals of at least two modes, for example, shared by the FDD mode and the TDD mode, and makes the sharing of analog and digital parts in the radio frequency unit a reality.

What is claimed is:

1. A multiplexer, set between a transceiving antenna and a receiving channel as well as a transmitting channel; wherein the transceiving antenna, the receiving channel and the transmitting channel are shared by signals of at least two modes, the multiplexer comprises:

a combiner module, as well as transmitting filter modules, receiving filter modules and amplifier modules in one-to-one correspondence with the signals of various modes;

wherein each transmitting filter module is configured to select a signal of a corresponding mode from signals to be transmitted through the transmitting channel, and transmit the signal of the corresponding mode to the transceiving antenna;

each receiving filter module is configured to select a signal of a corresponding mode from signals received by the transceiving antenna, and transmit the signal of the corresponding mode to the amplifier module connected thereto;

each amplifier module is configured to amplify the signal of the corresponding mode selected by the receiving filterer module connected thereto and transmit the signal of the corresponding mode to the combiner module;

the combiner module is configured to receive signals amplified by each amplifier module, performs combination processing on the signals, and transmit the combined signal to the receiving channel.

2. The multiplexer of claim 1, wherein the signals of the at least two modes comprise signals of two modes that are frequency division duplexing signal and time division duplexing signal, respectively.

3. The multiplexer of claim 2, further comprising:

a time division duplexing device, configured to connect or isolate a transmitting filter module and a receiving filter module corresponding to the time division duplexing signal.

4. The multiplexer of claim 3, wherein, the transmitting filter module and the receiving filter module corresponding to the time division duplexing signal are the same two filter modules, a first end of the time division duplexing device is connected to one of the two filter modules, a second end is connected to the other filter module of the two filter modules, and a third end is connected to the transmitting channel; or the third end is connected to the amplifier module corresponding to the time division duplexing signal.

5. The multiplexer of claim 4, wherein, the time division duplexing device comprises a first radio frequency switch, a second radio frequency switch and a two-way radio frequency switch; a first end of the two-way radio frequency switch is connected to one of the two filter modules; another end of the two-way radio frequency switch is connected to a first end of one of the first and second radio frequency switches, or is neither connected to the first radio frequency switch nor to the second radio frequency switch;

a second end of the first radio frequency switch is connected to the other filter module, and a second end of the second radio frequency module is connected to the transmitting channel;

or a first end of the first radio frequency switch is connected to the other filter module, and a second end of the second radio frequency switch is connected to the amplifier module corresponding to the time division duplexing signal.

6. The multiplexer of claim 2, wherein, each receiving filter module or each transmitting filter module comprises at least one filter.

7. The multiplexer of claim 3, wherein, each receiving filter module or each transmitting filter module comprises at least one filter.

8. The multiplexer of claim 4, wherein, the time division duplexing device comprises a first radio frequency switch, a second radio frequency switch and a circulator; one end of the circulator is connected to one of the two filter modules; the other end of the circulator is connected to a first end of one of the two radio frequency switches;

a second end of the first radio frequency switch is connected to the other filter module, and a second end of the second radio frequency switch is connected to the transmitting channel;

or the first radio frequency switch is connected to the other filter module, and the second radio frequency switch is connected to the amplifier module corresponding to the time division duplexing signal.

9. The multiplexer of claim 8, wherein, each receiving filter module or each transmitting filter module comprises at least one filter.

10. The multiplexer of claim 4, wherein, each receiving filter module or each transmitting filter module comprises at least one filter.

11. The multiplexer of claim 5, wherein, each receiving filter module or each transmitting filter module comprises at least one filter.

12. The multiplexer of claim 1, wherein, each receiving filter module or each transmitting filter module comprises at least one filter.

* * * * *